US007698151B2

(12) United States Patent
Gozzo et al.

(10) Patent No.: US 7,698,151 B2
(45) Date of Patent: Apr. 13, 2010

(54) ELECTRONIC DOCUMENT PRESENTMENT SERVICES IN THE EVENT OF A DISASTER

(75) Inventors: Francesco Gozzo, Raleigh, NC (US); Emmett M. Perry, Jr., Raleigh, NC (US); William W. Walker, Raleigh, NC (US); Michael J. Maselli, Apex, NC (US); James N. Sutton, Jr., Apex, NC (US)

(73) Assignee: Bell & Howell Mail and Messaging Technologies Company, Durham, NC (US)

( * ) Notice: Subject to any disclaimer, the term of this patent is extended or adjusted under 35 U.S.C. 154(b) by 1779 days.

(21) Appl. No.: 10/335,910

(22) Filed: Jan. 3, 2003

(65) Prior Publication Data

US 2009/0037762 A1 Feb. 5, 2009

Related U.S. Application Data

(60) Provisional application No. 60/364,596, filed on Mar. 18, 2002.

(51) Int. Cl.
*G06Q 10/00* (2006.01)

(52) U.S. Cl. ....................................................... 705/1.1

(58) Field of Classification Search ...................... 705/1
See application file for complete search history.

(56) References Cited

U.S. PATENT DOCUMENTS 5,648,916 A * 7/1997 Manduley .................... 700/90
5,790,790 A 8/1998 Smith et al.
6,092,090 A 7/2000 Payne et al.
6,304,857 B1 * 10/2001 Heindel et al. ................ 705/34
6,334,116 B1 * 12/2001 Ganesan et al. ............... 705/34
2002/0036797 A1 * 3/2002 Yamamoto ................. 358/1.15
2002/0042808 A1 * 4/2002 Smith et al. .................... 709/1

(Continued)

FOREIGN PATENT DOCUMENTS

WO WO 97/09682 3/1997

(Continued)

OTHER PUBLICATIONS

Accelerated Payments Inc., Accelerate Growth; Acquires Laser Net Inc., Output Operations, Apr. 10, 2001, PR Newswire, Financial News, pp. 1-2.*

*Primary Examiner*—Jamisue A Plucinski
(74) *Attorney, Agent, or Firm*—McDermott Will & Emery LLP

(57) ABSTRACT

The disaster recovery techniques, for presentment of a company's bills, statements or the like, provide electronic document presentment in the event of a disaster that impacts the company's print mail delivery operation or other existing mailing system(s). Files containing electronic documents are received, from a system associated with the print mail delivery operation, and the documents are stored in a database. Preferably, the systems use the company's existing data files. The files may be converted to a format compatible with one or more electronic delivery methodologies, if necessary. The disaster recovery systems present notice and/or data from the documents to the company's customers electronically, for example as e-mail (notice or message containing some or all of the document data), as a document attachment to an e-mail, via a web site, and possibly via telephone voice announcement.

35 Claims, 7 Drawing Sheets

U.S. PATENT DOCUMENTS

| | | | | |
|---|---|---|---|---|
| 2002/0069163 | A1 * | 6/2002 | Gilbert | 705/40 |
| 2002/0107792 | A1 * | 8/2002 | Anderson | 705/40 |
| 2003/0074411 | A1 * | 4/2003 | Nale | 709/206 |
| 2003/0077097 | A1 * | 4/2003 | Parry | 400/74 |

FOREIGN PATENT DOCUMENTS

| | | |
|---|---|---|
| WO | WO 00/60504 | 10/2000 |

* cited by examiner

Legacy Company System
105
107
Staging Computer
111
Converter (if needed)
115
E-Mail Server
117
Web Server
121
Internet
123
PC
125
Voice Response Unit
131
PSTN
133
TELEPHONE
135

257
258
251
256
I/O PORTS
MEM.
255
253
CPU
254
252
259
COM INTRF.
TO NTWK

355
MEM.
353
354
CPU
359
352
COM INTRF.
TO NTWK
351

ELECTRONIC DOCUMENT PRESENTMENT SERVICES IN THE EVENT OF A DISASTER

CROSS-REFERENCE TO RELATED APPLICATION

This application claims the benefit of U.S. Provisional Application No. 60/364,596 entitled "Electronic Document Presentment Services in the Event of a Disaster" filed on Mar. 18, 2002, the disclosure of which is entirely incorporated herein by reference.

FIELD OF INVENTION

The present subject matter relates to a service for presenting documents electronically in the event of a disaster that would otherwise prevent or substantially impair traditional mail production for delivery of important materials, such as bills, statements or the like.

BACKGROUND

Many businesses are sending bills or statements to their customers on a yearly, quarterly, monthly, or even daily basis. For example, a utility company may send millions of bills to their customers every month. As another example, a brokerage firm or other financial institution may send thousands of trade confirmations to their customers, every business day. In either example, each document provides information that is both important to the customer and/or a means of revenue collection for the company.

And the information is time sensitive. Customers need to have current information regarding their accounts, and companies will not receive payment until their bills are sent. There may also be legal reasons why a customer needs to receive a communication within a certain period of time Today, the bulk of such mission-critical time-sensitive materials still take the form of "paper-based" communication, such as statements and bills mailed via a postal service or competitive delivery provider. Traditional mail systems, however, are not foolproof. There are many events and circumstances that can cause a delay in sending out bills and statements via traditional paper-based mail. Examples include damage to the mail processing or finishing equipment due to a building collapse, fire or water damage, etc. Another example is a company upgrading their systems and having delays, which cause the document finishing equipment and/or other mailing equipment to not be up and running in time for their next delivery cycle.

Events and circumstances like these have caused companies to secure a backup solution, or insurance plan, for communicating their business critical information with their customers. Today, disaster recovery plans are limited to using another traditional mailing service that would not encounter the same disaster, as a backup for sending the normal bills and statements. However, the backup often is not particularly efficient. There may be problems and delays is switching-over and bringing the back-up mail production and delivery service up to capacity. The speed/capacity of the back-up systems may not be nearly as great as the normal systems, or the backup system may become overloaded if several client companies experience disaster(s) at about the same time. The disaster recovery service provider may only have plain paper stock and/or envelope stock, not pre-printed custom materials normally used by the client company. These and other problems with the backup system cause delays in distribution and attendant delays in the necessary responses by customers.

Also, the traditional back-up approach requires equipment, manpower, space, etc. that is in many ways a complete duplicate of the normal resources. Although some companies may effectively share the backup, for example, by subscribing to backup services offered by a commercial provider, still the duplicate resources may often sit idle. As a result, the company or companies paying for the backup must carry the high equipment and personnel costs on an ongoing basis, even though they are seldom used. Also, a backup system that is effective for one company may not be effective for another company having different types of documents to mail to customers.

Hence a need exists for an enhanced technique for providing disaster recovery for presentment systems for bills, statements and the like. An enhanced disaster recovery solution should be readily adaptable to virtually any company's documents and distribution needs. Further, as much as possible, the equipment should not duplicate existing hard copy processing systems, should be easy to bring on-line, and should not require unduly extensive idle back-up resources.

SUMMARY

The inventive concepts meet one or more of the above noted needs and address one or more of the problems with disaster recovery techniques, for presentment of bills and statements and the like, by providing electronic document presentment in the event of a disaster.

Concepts disclosed herein relate to methods and systems for recovery from a disaster, for example, effecting a print mail delivery operation. The service/system may also back-up an existing electronic delivery system. Files containing electronic documents are received, for example, from a system associated with the normal mail delivery operation. In response, the electronic documents are stored, for example, in a database. Data related to a stored electronic document is electronically presented to an intended recipient. In the disclosed embodiments, examples of electronic presentment of document related data include various notification messages, communication of summaries and transmission of details from documents or actual copies of the documents.

The electronic document files may be specially generated, for example, by scanning printed documents. However, the inventive techniques often use a company's existing data files. The files may be converted to a format compatible with one or more electronic delivery methodologies, if necessary. The disaster recovery systems present notice and/or data from the documents to the company's customers electronically, for example as an e-mail (notice or message containing some or all of the document data), as a document attachment to an e-mail, via a web site, via telephone voice announcement, etc. Web delivery and/or voice announcement delivery may use either a push delivery approach or a pull delivery approach.

The inventive recovery concepts encompass methods and systems for implementing the electronic document presentment in the event of a disaster. The electronic service may stand alone, or the service may be deployed as a compliment to a print-based disaster recovery system. Other inventive aspects relate to unique software or program products, for implementing the inventive disaster recovery service.

A software or program product includes information, which may be carried by at least one machine-readable medium. The information carried by the medium may be executable code, one or more databases and/or information regarding the documents available through the electronic delivery service(s). In disclosed embodiments, the information comprises executable code for causing one or more programmable computer systems to implement an electronic presentment service, for recovery from a disaster that impacts a print mail delivery operation.

A computer readable medium, as used herein, may be any physical element or carrier wave, which can bear instructions or code for performing a sequence of steps in a machine-readable form or associated data. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave may be received via a wireline or fiber-optic network, via a modem, or as a radio-frequency or infrared signal, or any other type of signal which a computer or the like may receive and decode.

Additional objects, advantages and novel features of the embodiments will be set forth in part in the description which follows, and in part will become apparent to those skilled in the art upon examination of the following and the accompanying drawings or may be learned by production or operation of the embodiments. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION

The various embodiments disclosed herein relate to systems and techniques for implementing electronic presentment, in the event of a disaster that disables all or a substantial portion of normal document delivery systems. As a standalone service, electronic delivery is a faster, easier, and cheaper recovery plan than using another mailing service for disaster recovery. If implemented as a compliment to a traditional print service, the electronic document presentment can allow at least selected customers early notice and access to their materials, even if the notice indicates that hardcopy materials will follow. The inventive concepts alleviate noted problems with delivery of bills and statements in the event of a disaster. The inventive techniques provide an alternative, electronic, method for presenting document data to customers. Prompt alternate delivery helps to maintain prompt customer payments, and the electronic approach may further expedite collections by offering one or more electronic payment options.

The electronic disaster recovery service may operate as a separate standalone service, or the electronic disaster recovery service may be operated as a compliment to a more traditional print-based backup service. If operated in conjunction with a print-based backup system, the electronic service might provide notice of the disaster and electronic access to the materials, for the client-company's largest customers, say the top 10% of the customer base, for example. If operating as the main or sole backup, the electronic service may provide notice of the disaster to customer, and the service would provide electronic presentment of the client company's materials. If provided, the notice would inform customers of the disaster and of the options/manner of obtaining electronic access. If appropriate, the notice messages may also inform customers that print copies of the materials will follow in due course.

Figure 1:
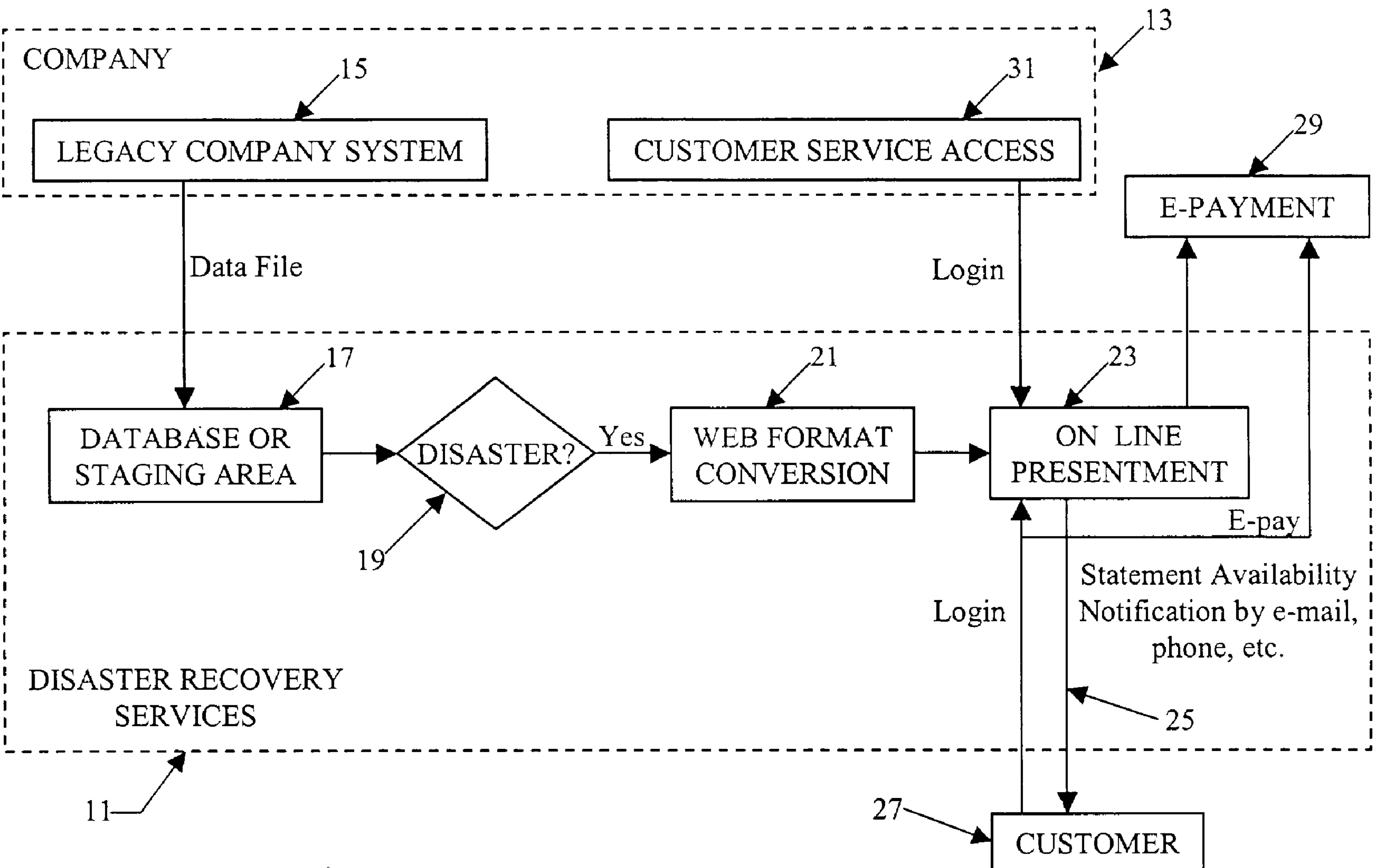
FIG. 1 is a block diagram that illustrates a service data flow for electronic disaster recovery.

Reference now is made in detail to the presently preferred, examples which are illustrated in the accompanying drawings and discussed below. As noted, the electronic disaster recovery system may operate as an independent replacement or in combination with a conventional print-type disaster recovery system. The structure and operations of print mailing systems are well known. Hence, further discussion will focus on the electronic disaster recovery system and operating techniques as they might implement a standalone disaster recovery service. FIG. 1 is a block diagram that illustrates a service data flow for electronic disaster recovery in document presentment.

The electronic disaster recovery system may be operated by the Company that normally performs the critical print mailing, for example, a telephone or credit card company that normally sends invoices to its customers or a financial institution that normally sends trade confirmations to its customers. In many cases, however, a separate service provider offers disaster recovery services (electronic and possibly associated print-based services) to a number of such client companies. For discussion purposes, FIG. 1 illustrates an implementation of disaster recovery services 11 provided by an entity separate from the client company 13 (or companies) that normally perform the print mailings as part of their mission critical business operations. For ease of illustration, the embodiment offers the electronic service as a standalone service, and elements for optionally providing an associated print-based service are omitted.

Typically, companies have a mechanism of generating data files with bill and statement information, in the normal course of business, for example, to drive the printers and mail equipment for generating documents and sending then in hard copy format via the mails. The existing legacy system(s) 15 in the company 13 often generate such files for their own purposes. For purposes of disaster recovery, the company 13 preferably provides copies of these files to the computer systems used, by the company or a more likely the separate service provider 11, for the disaster recovery functions. In the example, the company 13 routinely sends the files to the provider 11, as part of everyday ongoing operations of the business. Various formats of account data files may be sent from the legacy system to equipment providing the disaster recovery services. Data is delivered via any secure electronic transfer, including FTP, SecureFTP, HTTPS, SSH, etc. The disaster recovery system receives and maintains a database or file repository for the company's bill or statement files (or other appropriate documents), as shown as the database or staging area function 17 in FIG. 1. The routine delivery of files populates the database, at least with the current cycle of intended mailing documents, preferably in advance of any disaster that might impair or interrupt the normal print-based mailing operations.

Files may also be received after a disaster, for example, if the legacy data processing equipment is still operational (but the print shop is disabled by the disaster). If available in such a case, the files may be relayed in electronic form from the legacy system(s) to the disaster recovery equipment. In some circumstances, however, usable files may not exist or may not be available. Under these circumstances, the electronic files may be created in other ways, for example, by scanning images of printed documents. Although often received before the disaster, there may be situations where the disaster occurs prior to the receipt of the files.

In the event of a disaster (decision block 19 in the diagram), the recovery service system 11 will begin processing the company document data files, for electronic presentment. If operated as a compliment to a print-type disagree recovery service, the disaster recognition in the decision block 19 would also initiate operation of the backup print mailing system on the client company's files. The disaster may be any form or unexpected or predictable event, which interrupts or impairs normal document processing and/or mailing operations of the company's legacy systems 15. The disaster recovery operations may be activated manually or in response to an automatic signal from some other system of the company or the service provider.

There are many electronic formats that may be used for the electronic document delivery functions, including, for example, XML, HTML, PDF, JSP, ASP, PHP, CGI-BIN, ASCII, etc. The document file information from the legacy system 15 of the company 13 may or may not be in a format that is compatible with electronic delivery. For example, if the service 11 will offer web-based presentment via a network, such as the Internet, the document files often will not be in a format compatible with web presentment technologies. However the file or files will contain the necessary account information. This disaster recovery service 11 includes any reformatting (21) of data necessary for using Web technologies or the like. The conversion function 21 may also convert files to a format compatible with e-mail communication. It is also envisaged that the disaster recovery service will convert the document files to a format capable of delivery via a voice response unit, typically to enable delivery to a customer via the telephone. In the example, upon conversion, the document files are available for customer access via on-line presentment, 23 for example, via web access through the Internet.

This disaster recovery technique also includes using solutions and services that allow a customer 27 to be notified of the alternative method of delivery, as represented by the arrow 25. Notification methods can include, but not be limited to, email, telephone, or fax. The notifications may go to relatively fixed locations, e.g., the user's desktop PC or fax machine. The notifications may also go to mobile devices such as laptop or handheld computing devices or mobile phones. The service may process each of these notifications separately, or use a solution or service that can take one notification message input and deliver one or more versions thereof via one or more channels, at options selected by the company and/or individual customers.

The notification message 25 can include, but not be limited to, information on a URL address to view an electronic statement, and any necessary identification (ID) and/or password (PW) required for authentication. Notification messages 25 could also include bill or statement summary information, and information on how to pay a bill with or without sending in a paper check. Electronic payment options 29 could include Web site, or via telephone, or any other electronic form. If there is an associated print-based disaster recovery service, the notification might also advise recipients that hard copies of the materials will follow shortly.

Personalized messages can also be included in this solution. Messages can be used to inform customers of the events that caused the disaster, or information related to how a customer can get more information about their accounts, or any other information a company 13 may wish to include.

This solution can also provide customer service representatives access (31) to the same on-line statements (23) as offered to the end-users.

As shown in the drawing, the disaster recovery service may also offer one or more electronic payment options 29. Non-paper check payments can be made either directly from an email or telephone notification, or from any of the on-line statement presentations. Payments can be made using electronic funds or credit cards, or any other electronic payment mechanisms.

Figure 2:
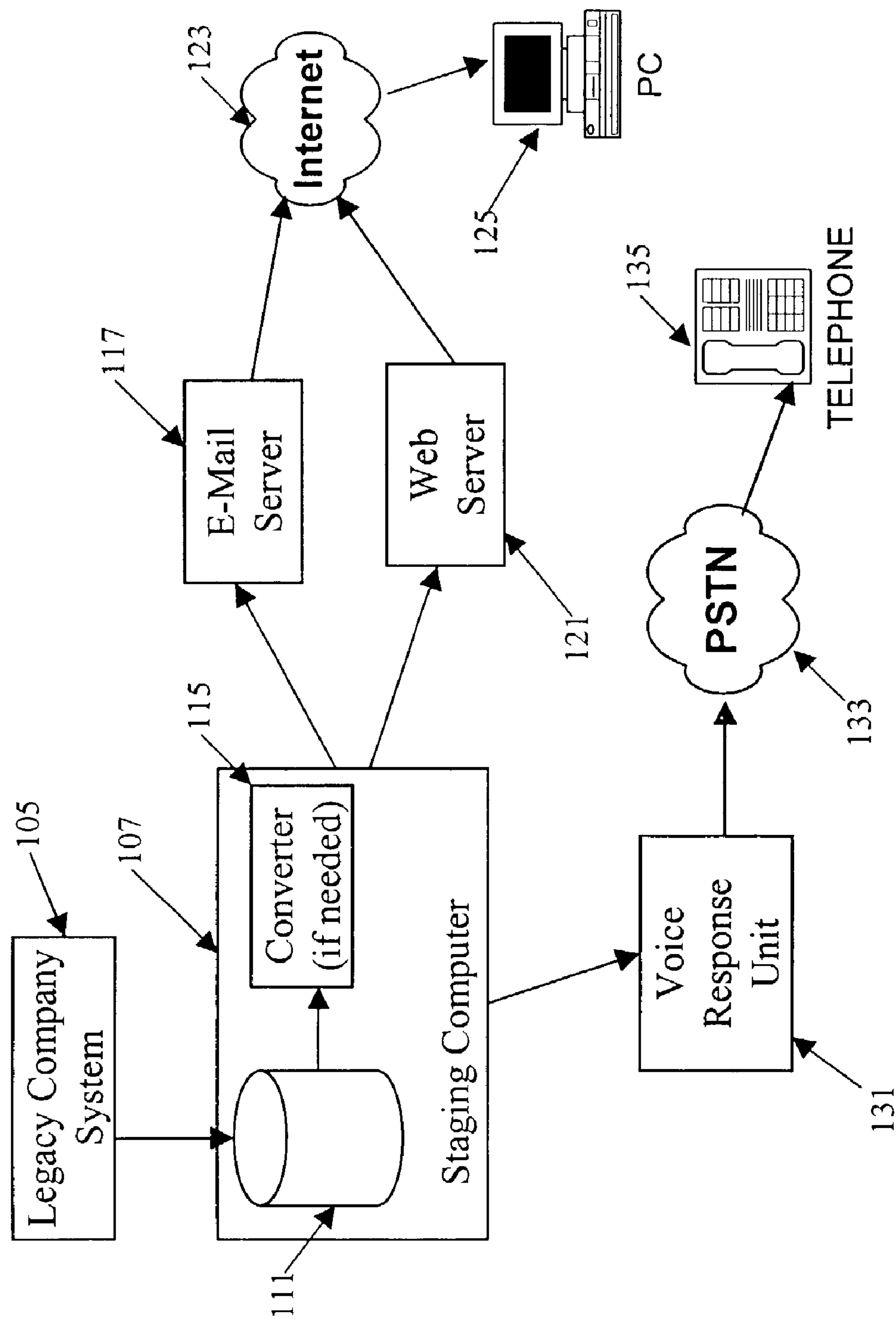
FIG. 2 is a simplified block diagram of an embodiment of systems for implementing the electronic disaster recovery of FIG. 1.

As shown by the above discussion, it is envisaged that the disaster recovery systems offer one or more electronic notification and document data delivery techniques, such as e-mail or web-based delivery via the Internet and/or voice message delivery via the telephone network. To appreciate how one might implement such a disaster recovery service, it may be helpful to consider a simple example of the hardware/systems. FIG. 2 is a functional block diagram showing one possible way to implement the document delivery aspects of the electronic disaster recovery service.

As shown by way of example if FIG. 2, a company's legacy system 105 for document delivery transmits document files to a staging computer 107. This transmission may use any appropriate local or wide area data communication media. Alternatively, the company could periodically place the files on a disk or tape for delivery to the division or company providing the disaster recovery service.

The staging computer 107 maintains a database or other file repository 111 for storing files from the legacy system 105. For a billing application, for example, the database 111 might store the files for one or two of the company's billing cycles. The files may be formatted before importation into the database. The files in the database 111 represent a digital back-up copy of the files used for normal purposes by the legacy system 105 in its generation and mailing of hardcopy documents. Although not shown for convenience of illustration, the staging computer may be an element of (or work in conjunction with) a print-based disaster recovery system.

The staging computer 107 may implement file format conversion 115, to convert the legacy file format(s) to one or more formats compatible with electronic delivery. The files are delivered to one or more systems that actually provide the electronic delivery. The example shown provides e-mail notification and/or document data delivery from a server 117 via the Internet 123. The embodiment also offers web-based delivery via a server 121 and the Internet 123. In either case, the service presents bills or statements to users via the computers, terminals or other appropriate data devices having Internet access, by way of example, represented by the Personal Computer (PC) 125 in the drawing.

The e-mail server 21 preferably provides an initial notice message to each of the intended recipients. The e-mail delivery may also provide summary or detailed data from the documents or copies of the documents, either embedded within e-mail messages or as attachments to e-mail messages. Web delivery may use either a push delivery approach or a pull delivery approach. In ether case, web or e-mail delivery, may offer access to summary data extracted from the original documents or complete copies of the electronically formatted documents.

The example shown also provides audible telephone type delivery. For that purpose, the staging computer 107 sends some or all of the files to a voice response unit 131. The voice announcement delivery technique may use either a push delivery approach or a pull delivery approach. Hence, the voice response unit 131 makes or receives telephone calls via the public switched telephone network (PSTN) 313 to/from customers' telephones 135. Although shown as a landline telephone for simplicity, obviously the user's telephone 135 may be a cellular telephone or other mobile telephone device. The voice response unit 131 receives inputs in the form of dialed or tone signals representing digits or speech commands, for example for purposes of identification and password validation and/or as selections needed to implement delivery of selected documents in desired order or form. The voice response unit 131 converts text from the document files to a speech format transmissible through the PSTN 133 and audibly perceptible by the user of the telephone 135.

The disaster recovery service may utilize any appropriate hardware for the delivery systems and in some cases for the reception by the customers. Preferred embodiments utilize general purpose computers in the form of servers or host computers for the staging and data storage computer and the document delivery functions. The users may have a simple standard telephone 135 or they may receive documents via personal computer 125 or similar general purpose programmable devices, such as portable digital assistants and the like. Voice response units such as shown at 131 also are common and well known in the telephone industry. It is presumed that readers are familiar with the structure and operation of such electronic devices. However, for completeness, in may be helpful to provide a summary discussion here of certain of the general purpose computers.

As noted in the discussion of FIG. 1, the voice telephone message functionality may provide notices to intended recipients of the disaster and/or how such end use customers might access electronic materials intended for them. The subsequent access to the materials may rely on e-mail delivery, web presentment or further voice message transmissions from the voice response unit 131, at the option of the sending company and/or the end use customer.

If using a data form of access, the end users may receive notifications and/or document presentment at any of a wide range of known devices such as web appliances, web TV, portable computing devices (e.g., laptops, handhelds and portable digital assistants) and web enabled mobile telephones. Most often, end users will utilize a form of personal computer or similar device. It is assumed that readers are familiar with the structure, programming and operation of all of these devices. However, for completeness, it may be helpful to consider a computer implementation of one such device.

Figure 3:
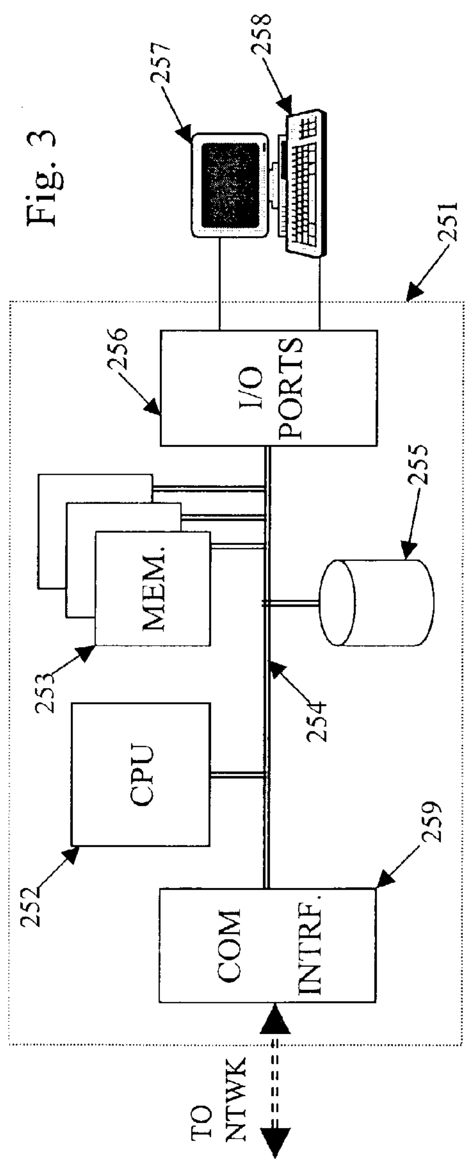
FIG. 3 is a simplified block diagram of a general purpose computer, for example, usable as one of the customer's personal computers in FIG. 2.

FIG. 3 is a functional block diagram of a PC or workstation type implementation of a system 251, which may serve as one of the user terminals, such as customer's computer 125 for receiving e-mail notification messages and web-based or e-mail type presentment of the document(s).

The exemplary computer system 251 contains a central processing unit (CPU) 252, memories 253 and an interconnect bus 254. The CPU 252 may contain a single microprocessor, or may contain a plurality of microprocessors for configuring the computer system 252 as a multi-processor system. The memories 253 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 252.

The mass storage may include one or more magnetic disk or tape drives or optical disk drives, for storing data and instructions for use by CPU 252. For a home PC, for example, at least one mass storage system 255 in the form of a disk drive or tape drive, stores the operating system and application software as well as data, including received messages and documents. The mass storage 255 within the computer system 251 may also include one or more drives for various portable media, such as a floppy disk, a compact disc read only memory (CD-ROM), or an integrated circuit non-volatile memory adapter (i.e. PCMCIA adapter) to input and output data and code to and from the computer system 251.

The system 251 also includes one or more input/output interfaces for communications, shown by way of example as an interface 259 for data communications via the network 23. The interface 259 may be a modem, an Ethernet card or any other appropriate data communications device. The physical communication links may be optical, wired, or wireless (e.g., via satellite or cellular network).

The computer system 251 may further include appropriate input/output ports 256 for interconnection with a display 257 and a keyboard 258 serving as the respective user interface. For example, the computer may include a graphics subsystem to drive the output display 257. The output display 257 may include a cathode ray tube (CRT) display or liquid crystal display (LCD). Although not shown, the PC type system typically would include a port for connection to a printer. The input control devices for such an implementation of the system 251 would include the keyboard 258 for inputting alphanumeric and other key information. The input control devices for the system may further include a cursor control device (not shown), such as a mouse, a trackball, stylus, or cursor direction keys. The links of the peripherals 257, 258 to the system 251 may be wired connections or use wireless communications.

Each computer system 251 runs a variety of applications programs and stores data, enabling one or more interactions via the user interface, provided through elements such as 257 and 258, and/or over the network 123 to implement the desired processing for the document presentment service. The customer computer 125, for example, runs a general purpose browser application and/or a separate e-mail program.

Figure 4:
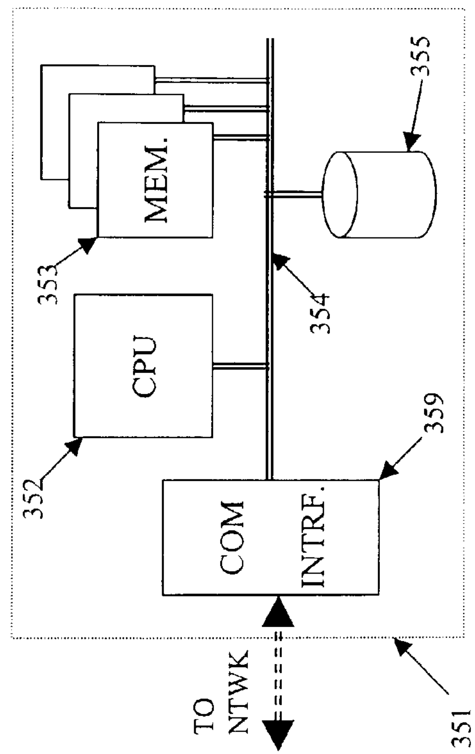
FIG. 4 is a simplified block diagram of a general purpose computer, for example, usable as one of the servers in FIG. 2.

FIG. 4 is a functional block diagram of a general purpose computer system 351, which may perform the functions of the staging computer 107 for storage of the document database 111 (and execution of the conversion routine 115), the e-mail server 117, the web server 121, or the like. A similar computer with a text to speech conversion program and telephone network interface may be used to implement the voice response unit 131.

The exemplary computer system 351 contains a central processing unit (CPU) 352, memories 353 and an interconnect bus 354. The CPU 352 may contain a single microprocessor, or may contain a plurality of microprocessors for configuring the computer system 352 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. At least one mass storage system 355, preferably in the form of a disk drive or tape drive, stores the database 111 used for the generation of electronic documents for the document presentment service. The mass storage 355 may also include one or more drives for various portable media, such as a floppy disk, a compact disc read only memory (CD-ROM), or an integrated circuit non-volatile memory adapter (i.e. PCMCIA adapter) to input and output data and code to and from the computer system 351.

The system 351 also includes one or more input/output interfaces for communications, shown by way of example as an interface 359 for data communications via the network 123. The interface 359 may be a modem, an Ethernet card or any other appropriate data communications device. To provide notifications and/or document data presentment to a large number of customers, for example if implementing the e-mail server 121 or the web server 121, the interface 359 preferably provides a relatively high-speed link to the Internet 123. The same or another interface provides communications between system computers, e.g. between the sever 117 or 121 and the staging computer 107. The physical communication links may be optical, wired, or wireless (e.g., via satellite or cellular network). Alternatively, the computer system may comprise a mainframe or other type of host computer system capable of web-based communications via the Internet 123.

Although not shown, the system 351 may further include appropriate input/output ports for interconnection with a local display and a keyboard or the like serving as a local user interface for programming purposes. Alternatively, the server operations personnel may interact with the system 351 for control and programming of the system from remote terminal devices via the Internet 123 or some other network link.

The computer system 351 runs a variety of applications programs and stores relevant data, such as the database 111. In server applications, one or more such application programs enable the delivery of web pages and/or the generation of e-mail messages or the conversion of text to speech for voice-like notification and/or presentment via the telephone network 133. The stored web pages include summaries, detailed information or copies of customers' documents. An e-mail message may similarly include the documents as embedded text, or e-mail messages may present the documents as attachments, for example in a generic file format such as PDF.

Those skilled in the art will recognize that the computer system 351 may run other programs and/or host other web-based or e-mail based services. As such, the system 351 need not sit idle while waiting for a disaster to activate the document presentment functions. In some applications, the same equipment may offer electronic presentment and bill payment functions to customers that have established electronic billing and payment accounts. If acting as the staging computer 107, the computer system 351 may provide at least the database 111 for an affiliated print-based disaster recovery service. As such the computer resources and associated operations support personnel need not be dedicated solely to the electronic disaster recovery service. Also, the system 351 may be implemented as a single computer system or as a distributed system having multiple appearances at different nodes on the Internet 123.

The components contained in the computer systems 251 and 351 are those typically found in general purpose computer systems used as servers, workstations, personal computers, network terminals, and the like. In fact, these components are intended to represent a broad category of such computer components that are well known in the art.

Certain aspects of the invention relate to the software elements, such as the executable code and the document database 111, the software used to implement the document conversion functions 115, the web or e-mail server functions (121 or 117), etc. These functions may reside on different physical systems as shown, linked by local or wide area communications networks. However communications between the legacy system 105 and the staging computer 107 and between the computer 107 and the servers 117, 121 or the voice response unit 131 preferably are private and/or appropriately secured.

The company that is normally presenting documents to their customers may operate the systems. Preferably, components of the inventive software reside in the computer system(s) of a separate service provider, who offers disaster recovery services and possibly other electronic services (e.g. regular electronic billing and/or payment services) to the same and/or other companies. The operator may also provide back-up print systems, for a print-type disaster recovery operation, in conjunction with the electronic disaster recovery service.

At different times all or portions of the executable code or database for any or all of the software elements may reside in physical media or be carried by electromagnetic media. The various data components as well as the company files relating to the bills or statements and/or converted forms thereof developed by the inventive processing also may reside in or be transported via a variety of different media. Physical media include the memory of the computer processing systems 251, 351, such as various semiconductor memories, tape drives, disc drives and the like of general-purpose computer systems. All or portions of the software may at times be communicated through the Internet 123 or various other telecommunication networks. Such communications, for example, may serve to load the software from another computer (not shown), for example, into the web server 121 or into any other computer system used in the disaster recovery service. Thus, another type of media that may bear the software elements includes optical, electrical and electromagnetic waves, such as used across physical interfaces between local devices, through wired and optical landline networks and over various air-links.

Terms relating to computer or machine "readable medium" as used herein refer to any medium that participates in providing instructions to a processor for execution or for carrying data to or from a processor for storage or manipulation. Such a medium may take many forms, including but not limited to, non-volatile media, volatile media, and transmission media. Non-volatile media include, for example, optical or magnetic disks, such as in any of the storage devices in the systems of FIGS. 2 and 3. Volatile media include dynamic memory, such as main memory. Transmission media include coaxial cables; copper wire and fiber optics, including the wires that comprise a bus within a computer system. Transmission media can also take the form of electric or electromagnetic signals, or acoustic or light waves such as those generated during radio frequency (RF) and infrared (IR) data communications. Common forms of computer or machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of computer or machine readable media may be involved in carrying one or more sequences of one or more instructions or data to a processor for execution.

Figure 5:
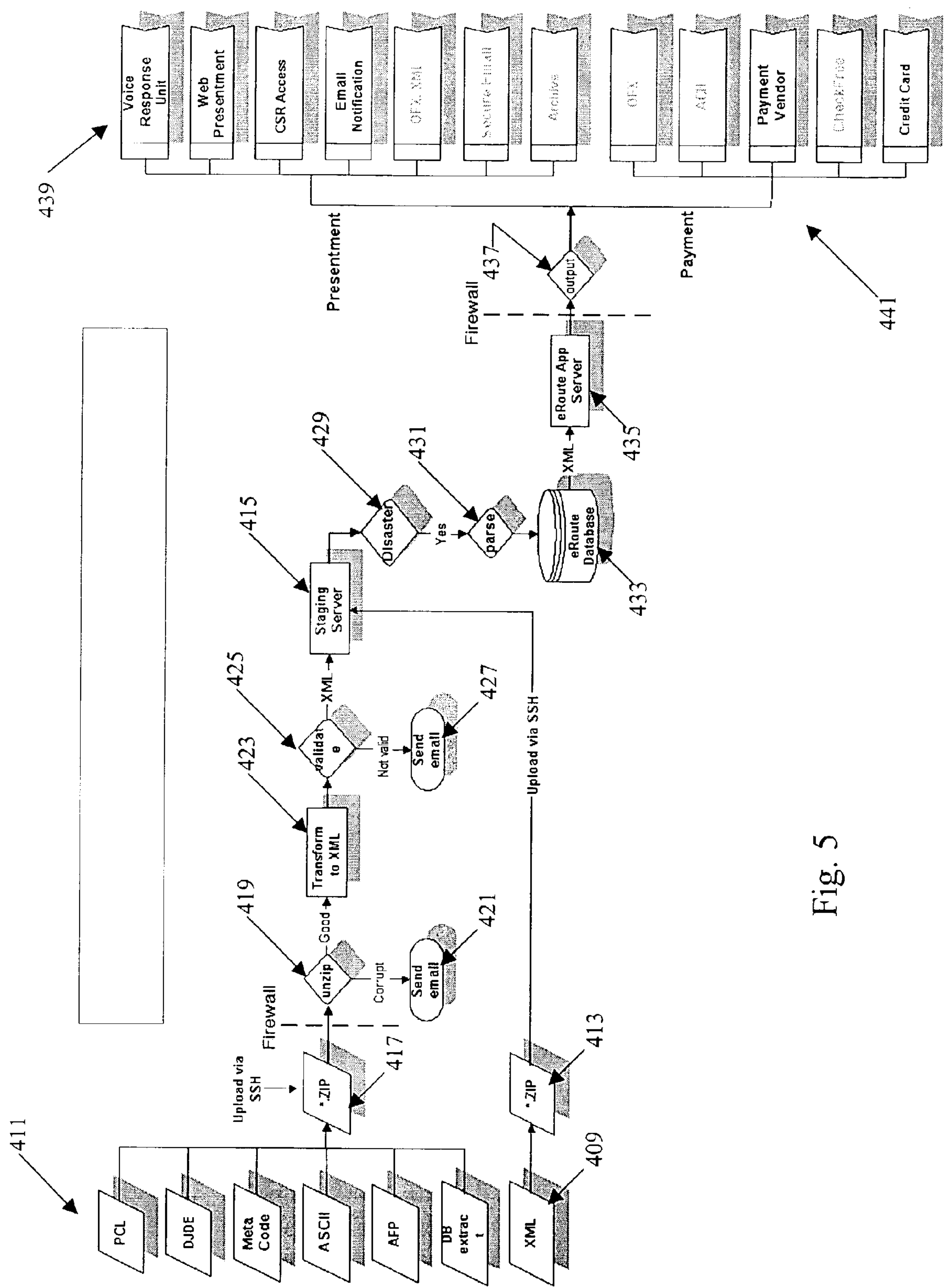
FIG. 5 is a data flow diagram for a commercial system implementing the disaster recovery solution.
Figure 6:
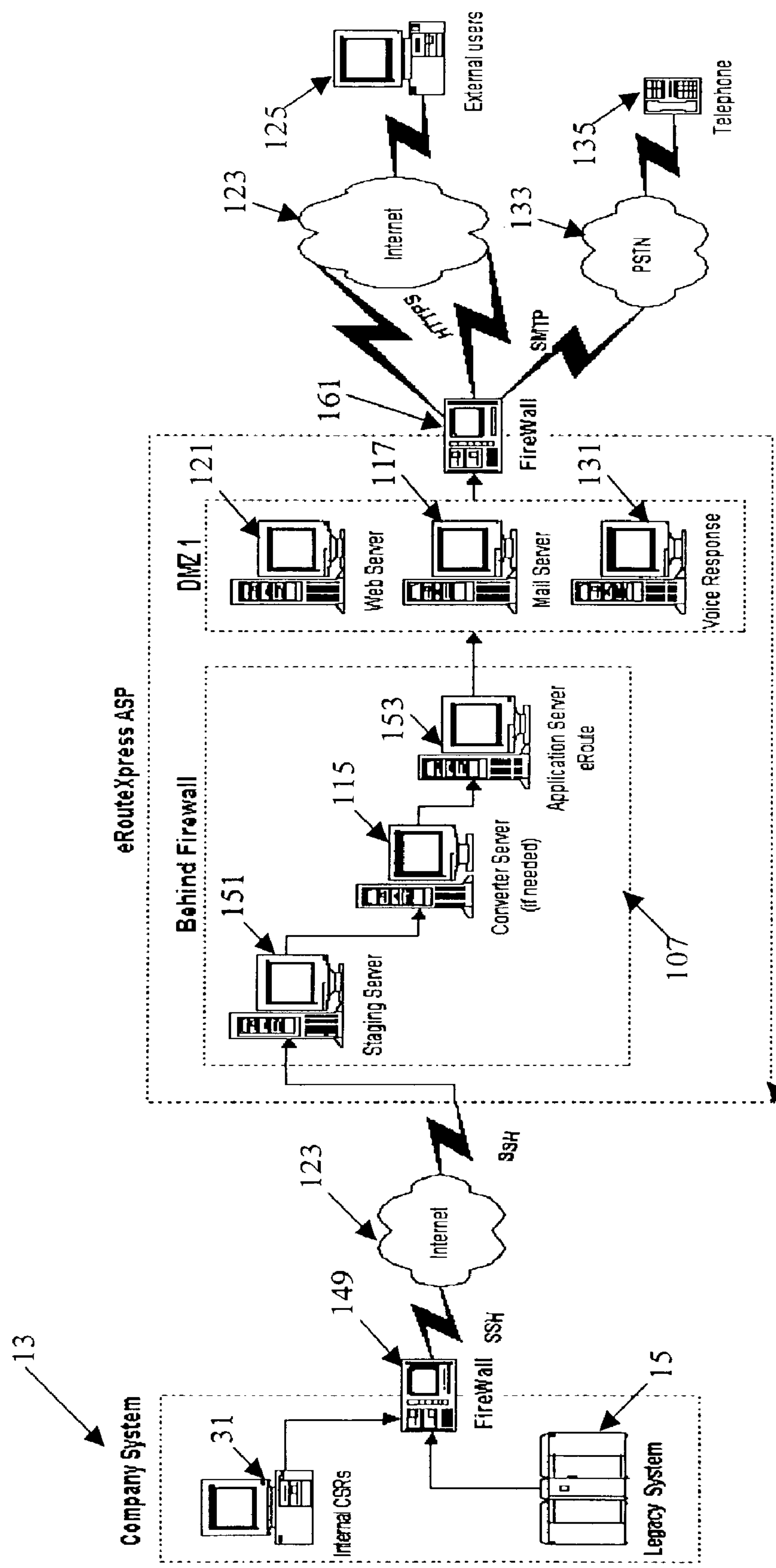
FIG. 6 illustrates a network topography of the initial commercial implementation.

FIG. 5 is a data flow diagram for a commercial system implementing the disaster recovery solution (with some options included), and FIG. 6 illustrates a network topography of that commercial solution.

The initial commercial implementation provides document presentment via the Internet 123, using XML format documents. However, the files supplied by the legacy system may arrive either in XML format as shown at 409 or any one or more of a variety of other formats, several examples of which appear at 411 in FIG. 5. The illustrated examples 411 include PCL, DJDE, Meta Code, ASCII, AFP and DB extract. The files preferably are compressed to reduce bandwidth. In the commercial embodiment, the files are compressed in a ZIP format. If in XML format, the received document files in ZIP format (413) are uploaded to the staging server (shown at 415), for storage. As shown, there may be a firewall in the path for receiving files, for example, when documents are received in a Zipped one of the legacy formats 411.

In the initial commercial implementation, a customer may send a non-variable text file in a format 411 (e.g. ASCII or CSV) that is converted to XML and then parsed into the database. Each such file is evaluated on a customer-by-customer basis, to determine the veracity of the file format and composition. End Users (typically the client company's customers) are pre-enrolled, using information already provided in the data feed (such as Account Number and Postal Code for the username and password).

In the illustrated process flow, if the files arrive in a different legacy format, it is necessary to validate the files and convert the files to XML before storage. Hence, the files in any of the formats 411 arrive in ZIP (compressed) form at 417 and are decompressed (unzipped) at 419. If the decompressed file appears corrupted, the system will send an e-mail notification to the client company (at 421).

Assuming the file is not corrupt and therefore can be unzipped at 419, the system will process the file from the legacy format 411 to convert the file to a corresponding XML format document (as shown at 423). At step 425, the processing checks the validity of the document in the XML format. The processing can check the successfulness of the XML formatting and/or whether the document contains appropriate content items in the expected locations within a particular client's documents, such as the length of account numbers and the like. If the XML document appears invalid for any reason, the system will send an e-mail notification to the client company (at 427). Assuming the XML document is not invalid, the system will upload it to storage within the staging server (as shown at 415). The service provider keeps the current statement data in the database that is available online to present statements. Older data may be removed permanently from the system, after the next cycle of statement data is in the database.

Those skilled in the art will recognize that the storage and format conversion(s) can be done in a variety of other ways. As just one example, received documents could be stored in native print format, in which case the conversion to appropriate electronic output form (e.g., XML) might be done "on the fly" as users request access to specific information. Of course, other Internet friendly protocols could be used, such as HTML or PDF, just to name two examples.

The system may be started manually, or it may run a processing loop to look for and await detection of a disaster (see step 429). As long as there is no disaster, the system waits. However, when the system detects a disaster at 429, processing branches to step 431 (or to 411 if the data is not yet received). In this step 431, files are recovered (unzipped if necessary) and parsed for immediate electronic presentment. The parsing, for example, may map data contained in the original files into data necessary for completion of a standardized document presentment format offered by the service, e.g. a summary (including the end user/account data and bottom-line) of an invoice that the client company may issue to its customers.

In the commercial embodiment (eMessaging eXpress™), the service provider offers an electronic presentment service using associated eRoute™ software, that provides electronic delivery in a number of different formats over the Internet. After parsing at 431, the documents are stored in the eRoute database 433. An eRoute™ server 435 provides functions similar to the web server and the e-mail server in the earlier embodiment, to output (at 437) notifications and data from the documents, to the client's customers. Preferably, a firewall is implemented in the path between the server 435 and the various forms of electronic output 437. The eRoute application server 435 offers a variety of presentment options, examples of which are shown at 439. The eRoute application server 435 also offers a variety of payment options, examples of which are shown at 441.

For the initial commercial implementation of the disaster recovery solution, it is not expected to use Marketing Messages, as this adds to the complexity of the solution. Setting up payment also adds to the complexity and thus implementation time and cost. Marketing Messages and on-line payment solutions, as outlined above, may be options or later "add-ons" to the base package for the commercial disaster recovery service.

The initial deployment for the disaster recovery service may be kept as streamlined as possible, to reduce time and cost. To this end, businesses would receive a default statement with their information. The system would also just convert the bill/statement summary information (name, address, account number, due date, amount due, etc) and not the details of the bill (line items, etc.).

FIG. 6 shows an alternate arrangement of the elements of a system embodiment, as the elements might be used to implement the commercial version of the electronic disaster recovery service discussed above relative to FIG. 5. FIG. 6, for example, shows the client-company's systems 13, including the legacy computer system 15 and one or more internal customer service representative (CSR) stations 31, behind a firewall 149. The application service provider (ASP) markets electronic presentment and related services, under a trademark such as eRouteXpress™.

The ASP operates the systems for the disaster recovery services 11. These systems include the computer system 107, which here comprises a number of servers. One of the servers 151 performs the staging function. Another server 115, if included, performs any desired conversions, for example from the delivery formats 439 into XML (or HTML, PDF, etc.), and the application server distributes the messages. The illustrated implementation includes the web server 121, the e-mail server 117 and the voice response unit 131. These servers 117, 121, 131 communicate with end users via a firewall 161. For example, the servers 117 and 121 send notifications and/or document data via the Internet 123 to computers 125 of end users, whereas the voice response unit 131 delivers notifications and/or document data as speech messages, through the PSTN 133 to customer telephone stations 135.

Although shown as two separate clouds, as a convenient way to illustrate two different communications, those skilled in the art will understand that the actual Internet 123 is an interconnected collection of networks forming a worldwide public packet data communication network.

Hence, the embodiment of FIGS. 5 and 6 will provide a number of feature sets to the client company. For example, the system will accept non-variable text file formats for validation and parsing. The client company typically will zip data files (e.g. print, ASCII, CSV, or XML) for transfer to the eRouteXpress server and encrypt using the WinZip password function. The client company will use a secure file transfer (using SSH) application to transfer the XML statement files to the secure ASP server. The client may use any secure shell product that meets the SSH Version 2.0 requirements. An example would be the latest version of the F-Secure SSH FTP client application. The client company typically is given a window during the week when the transfer to the ASP equipment will be made.

Preferably, each statement is one page. The ASP system will map the Account Summary information, including Account Number, customer (end user) Name as it appears on the Account, Account Address, Statement Date, Due Date and Amount Due, to form a one-page summary of the original document for presentment.

The web server 121 will provide a web site, for example, an eRoutexpress™ Site, for a number of features for the client company. These web access features include Customer Service, the ability to Search Customers, options to View Customer Account Information, and access to View Customer Statement(s). The eRouteXpress CSR Site is available to the Customer Service Representatives of the client companies, via the Internet and a current browser. There are two login accounts (username and password) per client company (Biller) to access this site. One is for CSR access, and one allows for both CSR access and access to view the reports.

The CSR functionality offered by an embodiment of this site includes a Login Page and Customer Search options. The search options, for example, allow a customer service representative to search the database by Account Number or by Account Name (name as if appears on the bill or statement). The CSR functionality also provides the customer service representative access to a Customer (client company) Statement, which is preferably displayed in a new browser window. The representative can also access Customer Account Information (non-editable) as well as Web Information (editable). The editable web information includes the end user's Email Address and Password and provides a Password Reset button. As noted, the eRouteXpress CSR Site also offers a CSR Manager Functionality, for example, to access a Reports Page. The current implementation provides ten pre-defined reports that can be viewed on this page. Reports can also be saved as a .CSV file, but the reports cannot be edited or deleted.

As noted, another option is to provide e-mail. The e-mails may provide a Notification Email, for a new statement. The e-mail service may also provide the actual statement delivery mechanism. In the embodiment of FIGS. 5 and 6, the e-mail server 117 will implement one template for each type of communication, e.g. one template for notification messages, one template for a company's invoices, another template for error messages to the client company, etc.

Email Notifications preferably are sent when a new file is brought into the system for delivery after a disaster, provided that the End User has provided an email address. Before a password can be changed, the End User must provide an email address.

Figure 7:
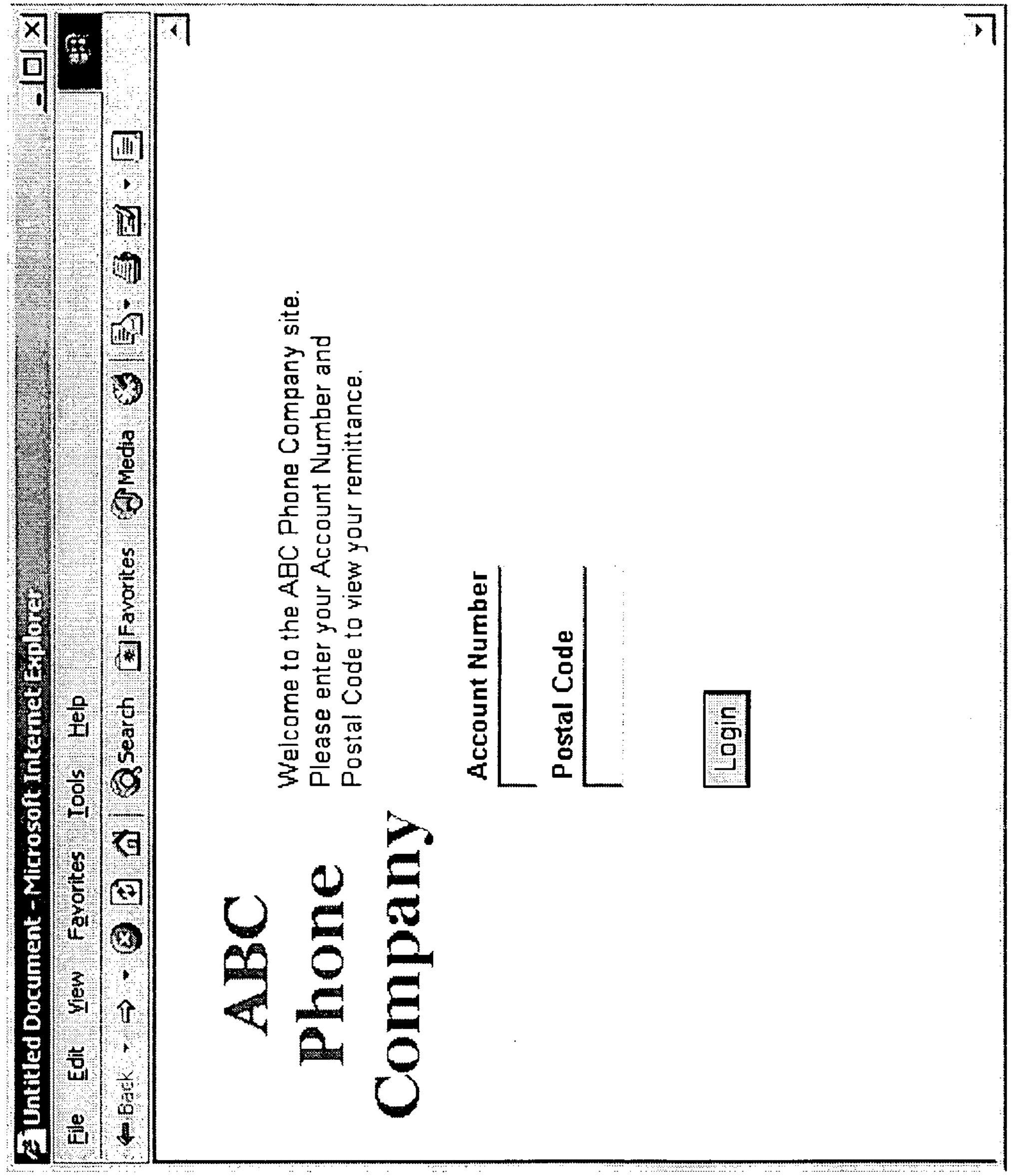
FIGS. 7 and 8 depict exemplary web screens, which may be used in the initial commercial implementation of the disaster recovery solution.
Figure 8:
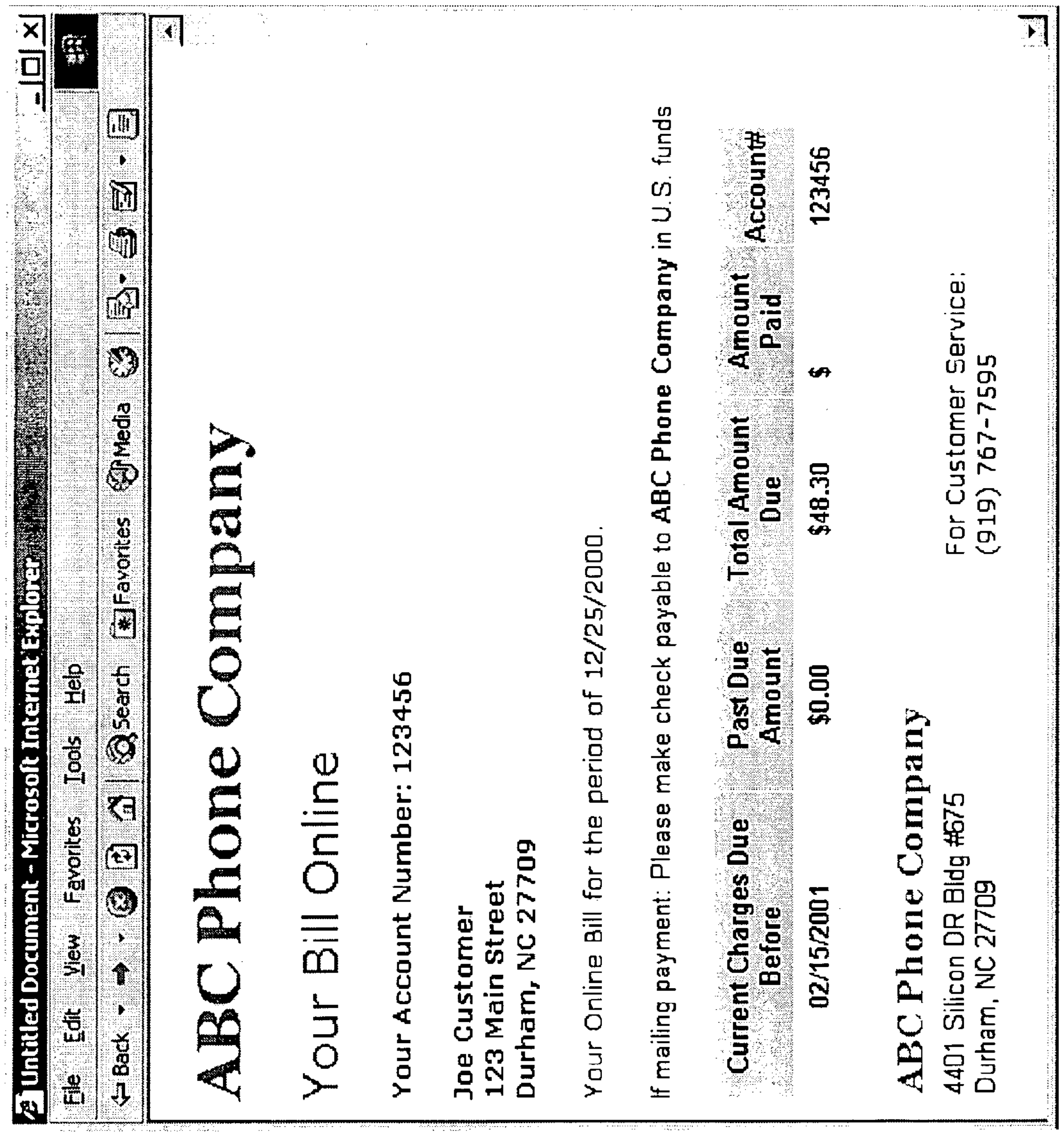

The web server 121 will also provide a web site, for End User access. In this embodiment, the End User Site will provide a Login Page, such as shown by way of generic example in FIG. 7. The embodiment of the End User Site will provide a FAQ Page (not shown), for displaying answers to frequently asked questions about the service. Of course, this End User Site will also offer validly logged-in users access to a Statement Page, which may display details of the statement or invoice issued by the client company for the particular end use customer. FIG. 8 depicts a generic example of one such Statement Page. In this example, the Statement Page provides a summary of the documents, based on mapping of data from the document to fields of the statement template.

The present embodiment of the End User Site will also provide an End User Maintenance page (not shown). This page offers validly logged in users (recognized customers of the client company) options regarding their electronically provided access to the company's materials, such as options to Change Password or Change Email (e.g. to input a new delivery address). On a commercial embodiment of this site, the end user will have a pre-defined username (account number) and password (Postal Code) to login to the site. The end user has the ability to change their password but not their username. An email will not be generated if the User changes their password on the End User Site. They will have the ability to enter their email address or change it after they successfully login.

The End User will be taken to a single page statement that has been designed to summarize or represent (duplicate) the paper statement (see FIG. 8). There will be no sorting of data or modifications that alter the appearance of the statement. Any graphics that will be on the statement page will are provided separately in a web-enabled format, such as a GIF or JPEG file format.

The present commercial embodiment also offers features relating to maintenance and support, for example, for transferring files via SSH. The maintenance and support features also include notification of errors via auto generated emails, and parsing of invalid materials.

The embodiment may also offer custom features as add-ons selected by each client company, to enhance the electronic service. Such optional add-on features include several options related to Targeted Marketing. For example, this feature may enable a client company to create a customer segment (Profile), to enable delivery of Targeted Messages (related promotional and other materials) to end use customers based on Marketing Profiles of the company's customers/users. The web interface provides client companies that subscribe to the Targeted Marketing feature access to Create Web Targeted Messages and to Create Text Targeted Messages.

Other custom features that client companies may opt to add-on to their service include Custom Reporting to create user defined custom reports. The service may also offer payment options, e.g. via ACH or credit/debit card. In the basic disaster recovery service discussed above, the service delivered at least summary data, mapped from the document file, for actual presentment to end users. As an add-on feature, the service also offers the capability of mapping more than Account Summary information, which involves mapping the details. This feature would include displaying the details to the end use customer via a JSP. The system may deliver statements or invoices or the like directly to end users in the form of PDF formatted documents for display or local hard-copy printing. The commercial service may also offer client companies options for storing more than current statement data. For example, a company may ask the service provider to store an additional page on both CSR and End User for a Statement List Page.

The drawings and the description above are given by way of example, as a detailed disclosure of presently envisioned embodiments of the electronic disaster recovery service. While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

Appendix—Acronym List

The written description above uses a number of acronyms to refer to various protocols, message format, system components and the like. Although generally known, use of several of these acronyms may not be strictly standardized in the art. For purposes of this discussion, acronyms have been defined as listed below.

| | |
|---|---|
| ACH | Automated Clearing House |
| AFP | AppleTalk File Protocol |
| ASP | Application Service Provider |
| ASCII | American Standard Code for Information Interchange |
| CD | Compact Disk |
| CD-ROM | CD-Read Only Memory |
| CGI | Common Gateway Interface (as in CGI-BIN) |
| CPU | Central Processing Unit |
| CRT | Cathode Ray Tube |
| CSR | Customer Service Representative |
| CSV | Comma Separated Values |
| DB | database (as in DB extract) |
| DJDE | Dynamic Job Descriptor Entry |
| DRAM | Dynamic Random Access Memory |
| EPROM | Electrically Programmable Read Only Memory |
| FTP | File Transfer Protocol |
| HTML | Hyper Text Markup Language |
| HTTPS | Hyper Text Transfer Protocol Secure |
| JSP | JavaServer Pages |
| LCD | Liquid Crystal Display |
| PC | Personal Computer |
| PCL | Printer Control Language |
| PCMCIA | Personal Computer Memory Card International Association |
| PDF | Portable Document Format |
| PHP | Hypertext Pre-Processor |
| PROM | Programmable Read Only Memory |
| PSTN | Public Switched Telephone Network |
| RAM | Random Access Memory |
| ROM | Read Only Memory |
| SSH | Secure Shell |
| XML | Extensible Markup Language |

What is claimed is:

1. An electronic presentment method, for recovery from a disaster effecting a print mail operation, the method comprising steps of:

confirming the occurrence of the disaster which interrupts or impairs normal print mail operation;

receiving files containing electronic documents, corresponding to a hardcopy of the documents that would be produced by the print mail operation for delivery;

storing the electronic documents in a format corresponding to a hardcopy of the documents that would be produced by the print mail operation for delivery;

identifying intended recipients of the electronic documents from the received files;

transmitting a notification message through a communication network to the identified intended recipients that the disaster has impaired the print mail operation from producing or delivering the hardcopy documents; and converting the stored electronic documents into a format capable of presenting the stored electronic documents to the identified intended recipients via a communication network, in response to the disaster impairing the print mail operation from producing or delivering the hardcopy documents.

2. The electronic presentment method as in claim 1, further comprising providing notice to a party associated with the print mail operation if a file is received that can not be processed for storage or for presentment via the network.

3. The electronic presentment method as in claim 1, wherein:

the received files are in one or more of a plurality of legacy formats for driving printers or mail equipment of said print mail operation to generate or send the documents in hardcopy form, and the files are received from a company generating or sending hard copies of the documents using the print mail operation.

4. The electronic presentment method as in claim 3, further comprising validating converted files before storage.

5. The electronic presentment method as in claim 4, further comprising providing notice to a party associated with the print mail operation if a file is received that can not be validly converted to the standard format for facilitating communication via the network.

6. The electronic presentment method as in claim 1, further comprising the step of parsing the stored electronic documents and transmitting the parsed documents to the identified intended recipients via the communication network.

7. The electronic presentment method as in claim 6, wherein the parsed documents comprise summary data mapped from respective electronic documents.

8. The electronic presentment method as in claim 6, wherein the parsed documents comprise detail data mapped from respective electronic documents.

9. The electronic presentment method as in claim 1, further comprising the step of presenting copies of the converted electronic documents to the identified intended recipients via the communication network.

10. The electronic presentment method as in claim 9, wherein the step of presenting data comprises transmitting notification messages through the communication network to the identified intended recipients.

11. The electronic presentment method as in claim 10, wherein the notification messages comprise messages in at least one form selected from the group consisting essentially of: e-mail, facsimile and telephone messages.

12. The electronic presentment method as in claim 10, wherein the step of presenting data further comprises making at least some data from the stored electronic documents available to the identified intended recipients via a communication network.

13. The electronic presentment method as in claim 9, wherein the step of presenting data comprises making data from the documents available to each of the identified intended recipients in at least one form selected from the group consisting essentially of: e-mail presentment via a data network, web page presentment via the data network, and voice response presentment of audio via a telephone network.

14. The electronic presentment method as in claim 9, wherein the step of presenting data comprises:

converting the data from a received format to a format compatible with web communication via the Internet; and presenting the converted data as web communications via the Internet.

15. The electronic presentment method as in claim 1, further comprising providing at least one electronic payment option to one or more of the identified intended recipients, to pay money via the communication network responsive to the presented data.

16. The electronic presentment method as in claim 1, further comprising providing support service access regarding operations of the method, for a customer service representative associated with the print mail operation.

17. A system for recovery from a disaster effecting a print mail operation, the system comprising:

a communication link for receiving files containing electronic documents corresponding to a hardcopy of the electronic documents that would be produced from a system associated with the print mail operation; and at least one programmed computer configured to perform the steps of:

confirming the occurrence of the disaster which interrupts or impairs normal print mail operation;

receiving the files containing the electronic documents, corresponding to the hardcopy of the documents that would be produced by the print mail operation for delivery;

storing the electronic documents in a format corresponding to a hardcopy of the documents that would be produced by the print mail operation for delivery;

identifying intended recipients of the electronic documents from the received files;

transmitting a notification message through a communication network to the identified intended recipients that the disaster has impaired the print mail operation from producing or delivering the hardcopy documents; and converting the electronic documents into a format capable of electronic presentment, and for presenting at least some of the converted electronic documents to intended recipients via a communication network, in response to a system generated disaster notification, the disaster impairing the print mail operation from producing or delivering the hardcopy documents.

18. The system of claim 17, wherein the at least one programmed computer system comprises an e-mail server for communication via a data network.

19. The system of claim 18, wherein the e-mail server sends notification to the intended recipients of availability of data from the stored electronic documents, upon occurrence of a disaster effecting the print mail operation.

20. The system of claim 18, wherein the e-mail server sends a message containing data from a stored electronic document to at least one of the intended recipients.

21. The system of claim 18, wherein the e-mail server sends a message with an attached copy of one of the stored electronic documents to at least one of the intended recipients.

22. The system of claim 17, wherein the at least one programmed computer system comprises a web server for presenting pages containing the data related to the stored electronic documents to the intended recipients via the Internet.

23. The system of claim 17, wherein the at least one programmed computer system comprises a voice response unit for sending the data related to the stored electronic documents to the intended recipients via a telephone network.

24. The system of claim 17, wherein the at least one programmed computer system comprises one or both of the following:

an e-mail server for sending notification to the intended recipients of availability of the data from the stored electronic documents, via a data network; or a web server for presenting pages containing the data from at least some of the stored electronic documents to the intended recipients via the data network.

25. The system of claim 24, wherein the at least one programmed computer system further comprises a voice response unit for sending data related to at least some of the stored electronic documents to the intended recipients via a telephone network.

26. The system as in claim 17, wherein:

the received files are in one or more of a plurality of legacy formats for driving printers or mail equipment of said print mail operation to generate or send the documents in hardcopy form, and the files are received from a company generating or sending hard copies of the documents using the print mail operation.

27. An electronic presentment method, for recovery from a disaster effecting a print mail operation, the method comprising steps of:

confirming the occurrence of the disaster which interrupts or impairs normal print mail operation;

receiving files containing electronic documents, corresponding to a hardcopy of the electronic documents that would be produced by the print mail operation;

storing the electronic documents in a format corresponding to a hardcopy of the documents that would be produced by the print mail operation;

identifying an intended recipient of one of the electronic documents;

automatically transmitting a notification message through a communication network to the identified intended recipient, in response to the disaster impairing the print mail operation from producing or delivering the hardcopy documents; and making at least some data from the one stored electronic document electronically available to the identified intended recipient, wherein the available data is converted into a format capable of presenting the stored electronic document to the identified intended recipient when accessed by the identified intended recipient.

28. The method of claim 27, wherein the step of making at least some data electronically available comprises providing web-access to the data, for the identified intended recipient, via the Internet.

29. The method of claim 27, wherein the step of making at least some data electronically available comprises sending the data to the identified intended recipient as audible speech representations of the data, via a telephone network.

30. The method of claim 27, wherein the notification message is of a type selected from the group consisting essentially of: e-mail, facsimile and telephone message.

31. The electronic presentment method as in claim 27, wherein:

the received files are in one or more of a plurality of legacy formats for driving printers or mail equipment of said print mail operation to generate or send the documents in hardcopy form, and the files are received from a company generating or sending hard copies of the documents using the print mail operation.

32. A program product, comprising a physical machine-readable storage medium and executable code embodied in the medium, wherein execution of the code by at least one programmable computer causes the at least one programmable computer to perform the sequence of steps, comprising:

confirming the occurrence of the disaster which interrupts or impairs normal print mail operation;

receiving files containing electronic documents, corresponding to a hardcopy of the electronic documents that would be produced by a mail delivery operation;

storing the electronic documents within the at least one programmable computer in a format corresponding to a hardcopy of the documents that would be produced by the mail delivery operation;

identifying one or more intended recipients of the electronic documents from the received files;

transmitting a notification message through a communication network to the identified intended recipients that the disaster has impaired the print mail operation from producing or delivering the hardcopy documents; and converting the stored electronic documents into a format capable of presenting the stored electronic documents to the identified intended recipients via a communication network, in response to a disaster impairing the print mail operation from producing or delivering the hardcopy documents.

33. The program product of claim 32, wherein:

the received files are in one or more of a plurality of legacy formats for driving printers or mail equipment of said print mail operation to generate or send the documents in hardcopy form, and the files are received from a company generating or sending hard copies of the documents using the print mail operation.

34. A program product, comprising a physical machine-readable storage medium and executable code embodied in the medium, wherein execution of the code by at least one programmable computer causes the at least one programmable computer to perform the sequence of steps, comprising:

confirming the occurrence of the disaster which interrupts or impairs normal print mail operation;

receiving files containing electronic documents, corresponding to a hardcopy of the electronic documents that would be produced by a print mail operation;

storing the electronic documents within the at least one programmable computer in a format corresponding to a hardcopy of the documents that would be produced by the print mail operation;

identifying an intended recipient of one of the electronic documents;

automatically transmitting a notification message through a communication network to the identified intended recipient, in response to a disaster impairing the print mail operation from producing or delivering the hardcopy documents; and making at least some data from the one stored electronic document electronically available to the identified intended recipient, wherein the available data is converted into a format capable of presenting the stored electronic document to the identified intended recipient when accessed by the identified intended recipient.

35. The program product of claim 34, wherein:

the received files are in one or more of a plurality of legacy formats for driving printers or mail equipment of said print mail operation to generate or send the documents in hardcopy form, and the files are received from a company generating or sending hard copies of the documents using the print mail operation.

* * * * *